(12) United States Patent
Czainski et al.

(10) Patent No.: US 11,121,581 B2
(45) Date of Patent: Sep. 14, 2021

(54) VOLTAGE AND CURRENT COMPENSATION IN AN INDUCTIVE POWER TRANSFER UNIT

(71) Applicant: Bombardier Primove GmbH, Berlin (DE)

(72) Inventors: Robert Czainski, Doluje (PL); Stephan Bolz, Ruhpolding (DE)

(73) Assignee: Bombardier Primove GmbH, Berlin (DE)

( * ) Notice: Subject to any disclaimer, the term of this patent is extended or adjusted under 35 U.S.C. 154(b) by 755 days.

(21) Appl. No.: 15/768,321

(22) PCT Filed: Oct. 17, 2016

(86) PCT No.: PCT/EP2016/074888
§ 371 (c)(1),
(2) Date: Apr. 13, 2018

(87) PCT Pub. No.: WO2017/064325
PCT Pub. Date: Apr. 20, 2017

(65) Prior Publication Data
US 2018/0331573 A1    Nov. 15, 2018

(30) Foreign Application Priority Data

Oct. 16, 2015   (GB) ..................... 1518313

(51) Int. Cl.
| | |
|---|---|
| *H02J 50/10* | (2016.01) |
| *H01F 38/14* | (2006.01) |
| *H01Q 7/06* | (2006.01) |
| *H02J 50/90* | (2016.01) |

(Continued)

(52) U.S. Cl.
CPC .............. *H02J 50/10* (2016.02); *H01F 27/28* (2013.01); *H01F 38/14* (2013.01); *H01Q 1/248* (2013.01);
(Continued)

(58) Field of Classification Search
CPC ........ H01Q 1/248; H01Q 7/06; H04B 5/0075; Y02T 90/14; Y02T 10/7072; H02J 50/10;
(Continued)

(56) References Cited

U.S. PATENT DOCUMENTS

| | | |
|---|---|---|
| 7,454,170 B2 | 11/2008 | Goossens et al. |
| 9,866,036 B2 | 1/2018 | Asaoka et al. |

(Continued)

FOREIGN PATENT DOCUMENTS

| | | |
|---|---|---|
| CN | 103545866 A | 1/2014 |
| DE | 102011014752 A1 | 9/2012 |

(Continued)

OTHER PUBLICATIONS

Harney, Wireless Triangulation Using RSSI Signals. 2009.

*Primary Examiner* — Jared Fureman
*Assistant Examiner* — Duc M Pham
(74) *Attorney, Agent, or Firm* — The Webb Law Firm (57) ABSTRACT

An inductive power transfer unit includes a winding unit for inductive power transfer during a power transfer operation, a flux guide, and an antenna. The antenna is arranged with the flux guide for generating or receiving an antenna signal during an auxiliary operation, wherein a compensation winding is arranged, such that the compensation winding compensates for an induced voltage and/or induced current in the antenna guide during the power transfer operation.

12 Claims, 4 Drawing Sheets

(51) Int. Cl.
*H04B 5/00* (2006.01)
*H01Q 1/24* (2006.01)
*H02J 50/40* (2016.01)
*H02J 50/12* (2016.01)
*H01F 27/28* (2006.01)
*H02J 7/02* (2016.01)

(52) U.S. Cl.
CPC ............... H01Q 7/06 (2013.01); H02J 50/12 (2016.02); H02J 50/40 (2016.02); H02J 50/90 (2016.02); H04B 5/0037 (2013.01); H04B 5/0075 (2013.01); *H01F 2038/143* (2013.01); *H02J 7/025* (2013.01)

(58) Field of Classification Search
CPC .... H02J 7/025; H01F 27/28; H01F 2038/143; H01F 38/14
See application file for complete search history.

(56) References Cited

U.S. PATENT DOCUMENTS

| | | | |
|---|---|---|---|
| 2008/0224543 A1 | 9/2008 | Mizutani et al. | |
| 2010/0219697 A1* | 9/2010 | Azancot | H02J 7/0042 307/104 |
| 2010/0311328 A1* | 12/2010 | Kargl | H01Q 1/2225 455/41.2 |
| 2013/0062419 A1 | 3/2013 | Finn et al. | |
| 2014/0015480 A1 | 1/2014 | Cheikh et al. | |
| 2014/0302782 A1* | 10/2014 | Raab | H01F 38/14 455/41.1 |
| 2014/0306654 A1* | 10/2014 | Partovi | H02J 50/12 320/108 |
| 2015/0151641 A1 | 6/2015 | Berger et al. | |

FOREIGN PATENT DOCUMENTS

| | | |
|---|---|---|
| DE | 202013100528 U1 | 6/2014 |
| DE | 102013101152 A1 | 8/2014 |
| EP | 0525459 A1 | 2/1993 |
| GB | 2522852 A | 12/2015 |
| JP | 11122146 A | 4/1999 |
| JP | 200842761 A | 2/2008 |
| WO | 2011127455 A2 | 10/2011 |
| WO | 2012095896 A1 | 7/2012 |
| WO | 2014023595 A2 | 2/2014 |
| WO | 2014156145 A1 | 10/2014 |

* cited by examiner

VOLTAGE AND CURRENT COMPENSATION IN AN INDUCTIVE POWER TRANSFER UNIT

CROSS-REFERENCE TO RELATED APPLICATIONS

This application is the United States national phase of International Application No. PCT/EP2016/074888 filed Oct. 17, 2016, and claims priority to United Kingdom Patent Application No. 1518313.0 filed Oct. 16, 2015, the disclosures of which are hereby incorporated in their entirety by reference.

BACKGROUND

In recent years, development of inductive power transfer systems has drastically increased and great attention has been given to the overall structure of winding units and their combination with magnetizable materials. Inductive power transfer systems are usually used for charging vehicle batteries and comprise of at least two inductive power transfer units, a transmitting unit and a receiving unit that each have a winding unit to generate or to receive an alternating electromagnetic field for the transmission of power through magnetic induction. In order to successfully charge vehicle batteries in a reasonable time it is necessary to use a power transmission with a high magnitude.

In addition, antenna elements for positioning are often installed to complement the functionality of the inductive power transfer system or the inductive power transfer units, respectively. These antenna elements are used to align the receiving unit above the transmitting unit during an auxiliary operation of the inductive charging system. In one of the transmitting or receiving unit a transmitting antenna element is arranged, whereas in the other of the transmitting or receiving unit one or more receiving antenna elements are arranged. To align the receiving unit above the transmitting unit the transmitting antenna element is transmitting an electromagnetic antenna signal into the surrounding environment which antenna signal is then received by the receiving antenna elements. The received antenna signal is analysed and relative positions of the generating unit and the receiving unit are calculated by a control unit.

In most cases such antennas rely on radio waves or microwaves to transmit and receive information and thus operate in a similar range of wavelengths as the inductive charging system for power transfer.

WO 2011/127455 A2 describes a wireless charging and wireless power alignment of wireless power antennas associated with a vehicle.

WO 2014/023595 A2 discloses a vehicle and an induction charging unit, wherein the induction charging unit comprises a primary coil and the vehicle comprises a secondary coil. Further, in the charging position, the secondary coil is located in a preferred spatial position range with respect to the primary coil with the result that, in order to set the charging position, the system determines, by means of an electromagnetic distance and angle measurement using triangulation, a location which describes a time-dependent spatial position of the secondary coil with respect to the primary coil. The system detects, by means of the location and the charging position, at least one partial driving direction along which the location of a charging position can be approached.

The documents disclose communication antennas of an inductive power transfer unit, comprising the primary unit or the secondary unit. These communication antennas, however, are designed as individual elements.

The installation of these antennas is costly and requires additional space which in many inductive charging system environments is not available.

It is therefore an objective of the invention to provide for at least one additional antenna element at reduced costs and preferably with only little additional space required to install the additional antenna element.

Further, the magnitude of the signals used by the antenna element is small in comparison to the magnitude of the power transmission of the inductive charging system. In many cases, an antenna element is thus of much smaller size than the windings used for power transmission and are not designed for such high values of voltage or current induced during the power transfer operation. During the power transfer operation such an antenna element might take damage or might even be destroyed.

It is therefore another objective of the invention to prevent damage to the antenna element during the power transfer operation.

SUMMARY

These objectives are solved by an inductive power transfer unit with the features of the independent claim. Further preferred embodiments are described in the dependent claims.

The inductive power transfer unit has a winding unit for inductive power transfer, flux guiding means for guiding and channelling the magnetic flux inside the inductive power transfer unit, and an antenna element to generate or receive an antenna signal, preferably a positioning antenna signal to allow for an alignment of the inductive power transfer unit with a second inductive power transfer unit. According to the invention, the antenna element is arranged with the flux guiding means for generating or receiving an antenna signal during an auxiliary operation. The flux guiding means allows for a higher magnetic flux density usable by the antenna element and thus, the magnetic flux guiding means otherwise used for power transfer are advantageously also used during an auxiliary operation of the inductive charging system. That allows the antenna element to be designed in a smaller and more compact size. Further according to the invention, a compensation element is arranged, such that the compensation element compensates for an induced voltage and/or induced current in the antenna element during the power transfer operation. For example, the compensation may be achieved by having the compensation winding generate a voltage with an opposite amplitude to the amplitude of the voltage generated by the antenna element. Preferably, the antenna element and the compensation element are electrically arranged in series, but the voltage and current induced in the elements has a phase angle of 180° such that the voltages and currents cancel each other during the power transfer operation. This may be achieved by connecting the antenna element and the compensation element in electrically opposite directions. A further advantage of this arrangement in series is that the circuitry is a passive circuitry that does not require active control such as switches or a control unit. It may be possible that an auxiliary operation is conducted during a power transfer operation.

Inductive power transfer units may either be a primary unit or a secondary unit. A primary unit generates an alternating magnetic field while a secondary unit receives the alternating magnetic field to inductively generate a voltage and/or a current for utilization such as charging a vehicle battery. In this document, in general only one of the primary and the secondary unit is referred to. The other one of the primary unit or the secondary unit is referred to as the other power transfer unit. The primary unit usually is stationary while the receiving unit is arranged at a vehicle. It is possible to movably arrange the primary and/or the secondary unit with respect to the site they are located at by means of a lifting or moving device. It is possible to build a system with more than one primary unit or more than one secondary unit. For the purpose of generating or receiving the magnetic field each inductive power transfer unit comprises at least one winding unit that generates or receives the alternating magnetic field for power transfer. The winding units may have different forms such as a circular shape, an oval shape, a rectangular shape, an 8-shape, an overlapping shape or combinations thereof. It is possible that more than one winding unit especially with different phases may be installed in the inductive power transfer unit. To boost the power transfer and to guide the magnetic flux during power transfer operation, magnetic flux guiding means are arranged in close proximity to the winding unit. Moreover, the magnetic flux guiding means may be preferably arranged on the side of the winding unit that is turned away from the other power transfer unit, preferably stacking with the winding unit and to bundle and guide the magnetic flux in a small space behind the winding unit. In addition, shielding material might be arranged on the side of the flux guiding means turned away from the other inductive power transfer unit. The shielding material may be part of a housing of the inductive charging unit. Each of the antenna element and the compensation element may be at least partially arranged between the winding unit and the shielding material. In the case of a single pole winding unit it is possible that the compensation winding is realized by the winding unit by connecting the antenna element in an anti-serial connection.

In a preferred embodiment, the antenna element is wound around the flux guiding means for generating or receiving an antenna signal during the auxiliary operation. This arrangement of the antenna element enables the antenna element to use the previously installed flux guiding means. The antenna signal is amplified by the flux guiding means. The antenna signal is also guided and directed by the flux guiding means. Preferably, the antenna element is a small loop antenna that is designed to generate or receive an antenna signal with a greater wavelength as the characteristic size of the antenna element.

In a further preferred embodiment the antenna element is wound around the flux guiding element in a first winding direction and the compensation antenna element is wound around the flux guiding means in a second winding direction around the flux guiding means. In addition, the first winding direction and the second winding direction are opposite directions around the flux guiding means, such that the compensation antenna element compensates for an induced voltage and induced current in the antenna element during the power transfer operation. Further advantageously, the arrangement of opposite directions of the antenna element and the compensation element allows for an easy to install and less space requiring embodiment that at the same time generates cancelling out voltages and currents in the common circuitry of the antenna element and the compensation element.

In an alternative preferred embodiment the antenna element is wound around the flux guiding element in a first winding direction, wherein the compensation element is wound around the flux guiding means in a second winding direction around the flux guiding means, wherein the first winding direction and the second winding direction are the same direction around the flux guiding means, and wherein the antenna element and the compensation element are electrically connected in such a way, that the compensation antenna element compensates for an induced voltage and/or induced current in the antenna element during the power transfer operation. The configuration is very similar to the configuration with the opposite directions, but requires to electrically connect a positive terminal of the antenna element to a positive terminal of the compensation element. It depends on the geometry of the inductive power transfer unit to decide which of the two configurations is more advantageous. Advantageously, the arrangement of the antenna element and the compensation element with an electrical opposite polarity also allows for an easy to install and less space requiring embodiment that at the same time generates cancelling out voltages and currents in the common circuitry of the antenna element and the compensation element.

In combination or alternatively another preferred embodiment is proposed, wherein the antenna element is wound around the flux guiding means at a first location of the flux guiding means and the compensation element is wound around the flux guiding means at a second location of the flux guiding means distanced to the first location, and wherein during the power transfer operation a value of a magnetic flux through the flux guiding means at the first location is lower than a value of the magnetic flux through the flux guiding means at the second location. Depending on the kind of inductive power transfer unit and the arrangement of the flux guiding means, the magnetic flux that flows through the flux guiding means differs at different locations. For example in an embodiment having two magnetic poles the magnetic flux enters the inductive power transfer unit at the first pole, is guided by the magnetic flux guiding means and leaves the inductive power transfer unit at a second pole. Under the assumption that the inductive power transfer unit is designed symmetrically, the magnetic flux density is then highest at a first location in the middle of the magnetic flux guiding means between the first and second pole. Since the magnetic flux density is different at the middle location and at the outer location closer to the any one of the two poles, the antenna element and the compensation element may be advantageously designed in a non-symmetric—that is a different way—giving a larger freedom of design choices, and thus, conveniently allowing for an adapted design suitable for every design of the inductive power transfer unit.

Moreover, a further preferred embodiment of the inductive power transfer unit is provided, wherein the number of turns of the antenna element is larger than the number of turns of the compensation element. Above the advantages of locating the antenna element and the compensation element were explained. In such a situation it is possible to design the antenna element and the compensation element in such a way, that the compensation element has fewer turn. Therefore, the compensation element may be arranged in much smaller spaces. It is also possible to use more than one compensation element, wherein each one of the compensation elements has fewer turns than the antenna element. The turn ratio may be dependent on the inverse ratio of magnetic flux densities of the antenna element and the compensation element. The geometry of the compensation element and the antenna element needs also be considered when choosing the ratio of the turns. Preferably the ratio is 30 turns of the antenna element to 10 turns of the compensation element. Accordingly, the ratio of the magnetic flux density in this case—if both the antenna element and the compensation element have the same cross-section and are both wound around the magnetic flux guiding means—is 3:1 with the magnetic flux density at the location of the compensation winding being three times higher than at the location of the antenna element. A preferred range of the ratio of the number of turns of the antenna element to the number of turns of the compensation winding ranges from 10:1 to 1:1.

In another preferred embodiment, the antenna element and the compensation element are arranged such that the amplitude value of the antenna signal received or transmitted by the antenna element is larger than the amplitude value of the antenna signal received by the compensation element. This advantageously allows for a configuration that has little to no compensation during the auxiliary operation and thus minimizes losses during the antenna operation. This can be achieved for example by using different number of turns, amplifying the magnetic flux generated by the antenna element through the use of a magnetic core—such as the magnetic flux guiding means of the inductive power transfer unit—or by arranging the antenna element and the compensation element in a perpendicular orientation towards each other.

In a another advantageous arrangement of the inductive power transfer unit, the compensation element has a magnetic axis and with regard to its magnetic axis is arranged perpendicular to the direction of the magnetic flux density vector of the antenna signal. The magnetic axis is defined as a coils core axis or a coils axis around which the loops of the winding of a coil revolve. By arranging the compensation element in this way it will receive none or only a small portion of the antenna signal and thus is not excited as the antenna element is. Therefore, the compensation element advantageously plays no or only a small role in generating or receiving the antenna signal. In this regard the compensation element might be designed in a much simpler fashion such printed circuit board or printed electronic circuit glued to one of the ferrites with an electric insolation layer.

Further, in another preferred embodiment the antenna element and the compensation element each have a magnetic axis and with regard to their magnetic axes are arranged perpendicular to each other. In the case, in which the antenna element is a generating antenna element, the antenna signal generated will not or only be influenced minimally by the compensation antenna, since the magnetic axis of the compensation element is also arranged perpendicular to the magnetic flux density direction vector. In the case, in which the antenna element is a receiving antenna element, the compensation element may act as a second antenna element that allows for a detection or analysis of the antenna signal in the direction of the power transfer. Therefore, it is possible to detect whether or not the primary unit and the secondary unit are in alignment in a z-direction. For example SUVs and sports cars have a different ground clearance and thus it is necessary to account for a different air gap of the inductive power transfer system. In another example, the clearance might be adjusted by a lifting device in which case detection of distances in the z-direction could also be helpful to detect.

In another embodiment, the sensor antenna element is a transmitting antenna element.

In a further embodiment, the sensor antenna element is a receiving antenna element.

In a preferred embodiment, the flux guiding means has a permeability $\mu_r$ between 1 and 500000, in particular a permeability $\mu_r$ between 1000 and 50000, even more preferably a permeability $\mu_r$ between 5000 and 20000. The magnetic flux guiding means can be any material that enhances, guides or bundles the magnetic flux of the antenna signal and the power transfer. Preferably, the material is magnetic material such as iron, an iron alloy or ferrite.

BRIEF DESCRIPTION OF THE DRAWINGS

Further features and advantages of the inductive power transfer unit according to the present invention emerge from the exemplary embodiments described below.

Three preferred exemplary embodiments of an inductive power transfer unit according to the present invention will be described below and explained in greater detail with reference to the attached drawings.

Figure 1:
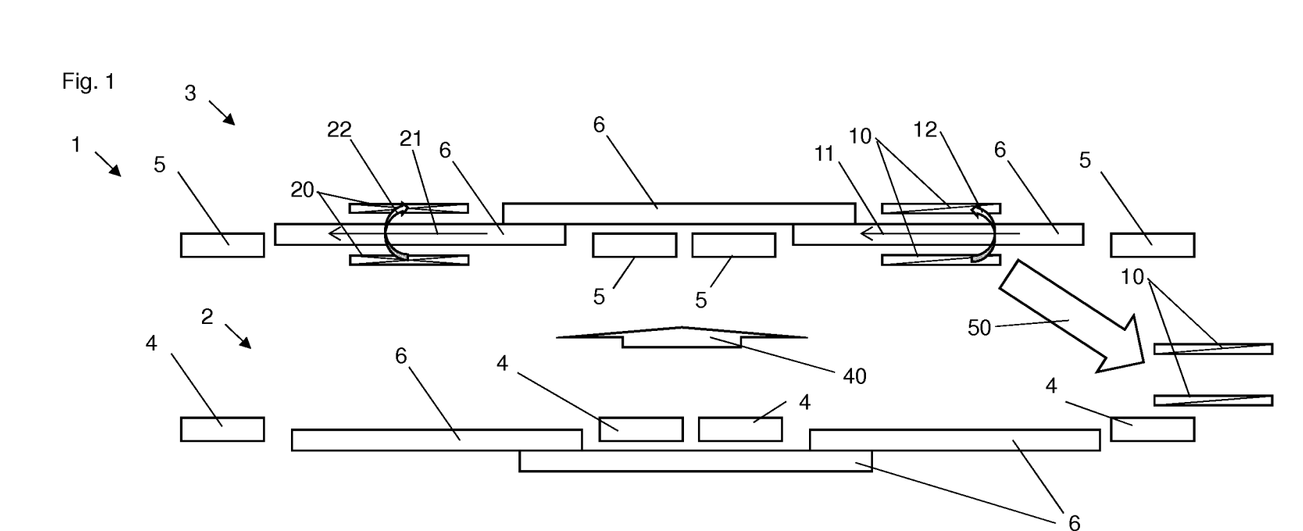
FIG. 1 shows a first embodiment of an inductive power transfer unit with a compensation element.
Figure 2:
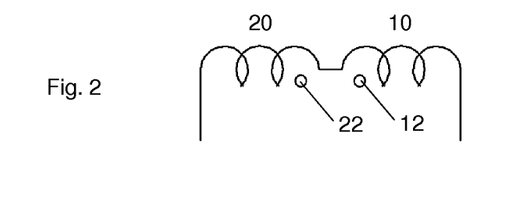
FIG. 2 shows the electrical diagram of a compensation circuit of the first embodiment.

FIGS. 1 and 2 illustrate a first embodiment of the inductive power transfer unit 2, 3 according to the invention. The inductive power transfer unit 2, 3 is part of a power transfer system 1 and can be a primary unit 2 or a secondary unit 3 of the inductive charging system 1.

As shown in FIG. 1 the inductive power transfer units 2, 3 each comprise a winding unit 4, 5 for generating or receiving an alternating magnetic field and a magnetic flux guiding means 6. Because of the similarity between the two power transfer units 2, 3, in the following paragraphs mainly the secondary unit 3 is described. As can be seen, the winding unit 5 includes two loops of litz wire, a left loop and a right loop. The flux guiding means 6 consist of multiple sintered ferrite blocks. Two of the ferrite blocks 6 are arranged inside one of the loops of the winding unit 5, while a third ferrite block 6 acts as a flux guiding bridge to guide the magnetic flux during the power transfer operation from the left pole to the right pole. The shown flux guiding means 6 are only one row out of multiple rows of flux guiding means 6 in a direction perpendicular to the drawing plane. Other configurations of winding units 4, 5 and flux guiding means 6 are possible, such as circular or single loop winding configurations. The direction of power transfer 40 is roughly depicted by an arrow.

Further, an antenna element 10 is wound around the right ferrite block 6, the antenna element 10 having a first magnetic axis 11 and being wound around the ferrite block in a first direction. Around the left ferrite block 6 a compensation winding 20 is wound in a second direction 22 opposite to the first direction 12. The compensation winding 20 also has a second magnetic axis 21. The circuitry of the antenna element 10 and the compensation element 20 is shown in FIG. 2.

The antenna element 10 and the compensation element 20 are connected in series but during a power transfer operation induce voltages and currents into the circuit with a phase angle of 180°. Since the antenna element 10 and the compensation element 20 are otherwise symmetrically arranged, the induced voltages and currents have amplitudes of the same magnitude but of opposite signs. Thus, the resulting voltages and currents have a magnitude that is low enough to not damage the circuitry of the antenna element 10 and the compensation element 20. Even a misalignment of the system that is a misalignment of the primary unit 2 and the secondary unit 3 does not have a significant impact. The magnitudes of the resulting voltages and currents would still be sufficiently low to prevent damage during the power transfer operation.

During an auxiliary operation of the inductive power transfer system 1 the antenna element 10 of the primary unit 2 and the antenna element 10 of the secondary unit 3 can be used to communicate with each other. In FIG. 1 the antenna element 10 of the primary unit 2 is a receiving antenna while the antenna element 10 of the secondary unit 3 is a transmitting antenna. In general, the direction of communication may also be reversed or bi-directional. Small adaptations of the antenna arrangements might be required.

When the antenna element 10 of the secondary unit 3 is excited it generates a magnetic field that travels through the magnetic core which is provided by the right ferrite block 6. At the same time, the compensation element 20 is also excited due to the serial connection of the antenna element 10 and the compensation element 20. Thus, a symmetrical magnetic field is generated that is an antenna signal 50. The antenna signal 50 will couple with the antenna element 10 of the primary unit 2.

The embodiment shown in FIG. 1 is not limited to a symmetrical configuration but asymmetrical configurations may be applied as well, as long as the antenna signal is still sufficiently strong and the compensation is of a sufficient quality to reduce the magnitudes of the voltages and currents induced in the antenna element and the compensation element.

Figure 3:
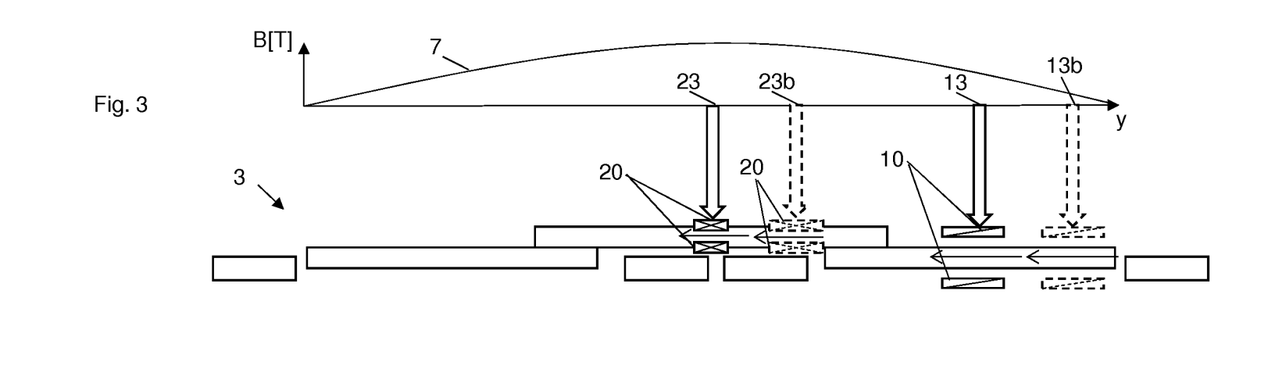
FIG. 3 shows a second embodiment of an inductive power transfer unit with a compensation element.

In FIG. 3 a second embodiment of the invention is shown. The arrangement of the primary unit 2 and the secondary unit 3 are similar and the description is therefore reduced to the differences.

In the second embodiment the antenna element 10 is still arranged at the right ferrite block 6 at a first position 13 while unlike to the first embodiment, in the second embodiment the compensation winding 20 is arranged on the middle ferrite block 6 at a second position 23. Above the drawing of the inductive power transfer unit 3 a curve diagram is shown, which depicts a distribution 7 of the magnetic field strength $\vec{B}$ [T] in the magnetic flux guiding means 6 during a power transfer operation over the y-extension of the inductive transfer unit 3. In this distribution 7 the reactive influences of the antenna element 10 and the compensation element 20 on the magnetic field are not taken into account. Further, it is assumed that the primary unit 2 and the secondary unit 3 are perfectly aligned. As can be seen, the highest amplitude of the magnetic field strength $\vec{B}$ [T] is reached in the middle ferrite block 6. This shape of the curve is a result of the symmetry of the inductive power transfer unit 3 and may vary with different configurations of the inductive power transfer system 1 or the alignment of the inductive power transfer units 2, 3 towards each other. The arrangement of the compensation unit 20 allows to decrease the number of turns necessary to compensate the induced voltages and currents in the antenna element 10, since the magnetic flux density within the middle ferrite block 6 at the second position 23 is much greater than the magnetic flux density in the right or left ferrite blocks 6.

Figure 4:
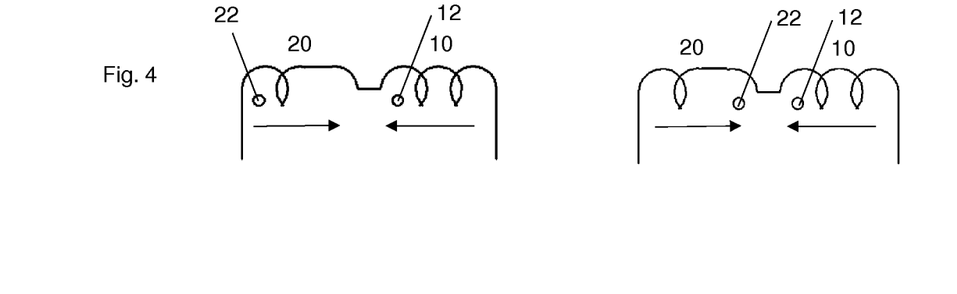
FIG. 4 shows the electrical diagram of a compensation circuit of the second embodiment.

Depending on the space available in the inductive power transfer unit 3 it is possible to arrange the compensation winding 20 in a second position 23 that is located on the middle ferrite block 6 away from the centre location. The alternative second position 23b of the compensation element 20 is drawn with dotted lines. Since at this position the amplitude of the magnetic field strength $\vec{B}$ [T] is still higher than at the first location 13 of the antenna element 10, the number of turns of the compensation element 20 can still be kept lower than the number of turns of the antenna element 10 to achieve a compensation of the induced voltages and currents during the power transfer operation. In FIG. 4 it is shown that the number of turns of the compensation element 20 is lower than the number of turns of the antenna element 10. Further, in FIG. 4 are two alternative circuit arrangements shown, that differ in their winding direction. As can be seen, in the left circuit the winding directions are as explained above. In the right circuit, the second direction 22 of the compensation element 20 is the same as the first direction of the antenna element 10. However, the antenna element 10 and the compensation element 20 are electrically connected in such a way that the voltages and currents that are depicted as arrows have an opposite polarity and thus cancel each other out.

Moreover, it is possible to arrange the antenna element at an alternative outer first location 13b. At the outer first location 13b the magnetic flux density is smaller than at the centre location at the original first location 13.

Figure 5:
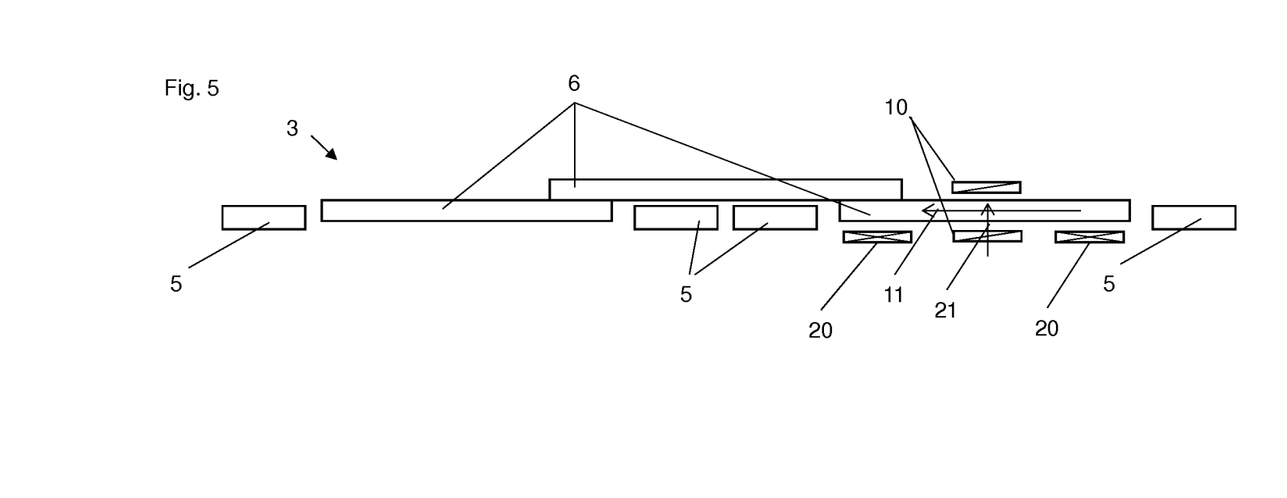
FIG. 5 shows a shows a third embodiment of an inductive power transfer unit with a compensation element.

In FIG. 5 a third embodiment of the invention is shown. As will be described now, the arrangement makes use of a single pole of the inductive power transfer unit 3. The used magnetic pole is located in the right ferrite block 6. The compensation winding 20 is almost as large as the pole area between the right loop of the winding unit 5 and therefore most magnetic flux lines will cross the cross-section of the compensation winding 20 before entering (or leaving) the right ferrite block 6. This results in a large enough induced voltage and current in the compensation element 20 to compensate for the induced voltage and current in the antenna element 10. The electrical circuit of the third embodiment is not shown, however the electrical circuit is similar to that shown in FIG. 2 and FIG. 4. As can be seen, the magnetic axis 21 of the compensation element 20 is arranged orthogonal to the magnetic axis 11 of the antenna element 10. Because of this orthogonal arrangement, and since the antenna element 10 has a magnetic core in form of the ferrite block 6, the antenna signal 50 generated by the antenna element 10 will be much stronger than any signal generated by the compensation unit, and thus, the compensation element 20 will not participate in the antenna signal 50 transmission.

It is possible to print a copper winding on an isolated copper foil to produce the compensation winding 20 and glue it to the ferrite blocks 6. The antenna element 10 is preferably a copper coil wound around the ferrite block 6 but may also be printed on a copper foil and connected it through a multipole plug.

Figure 6A:
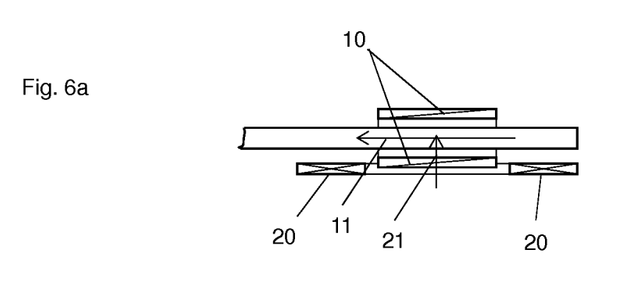
FIG. 6a shows a detailed view of the third embodiment.
Figure 6B:
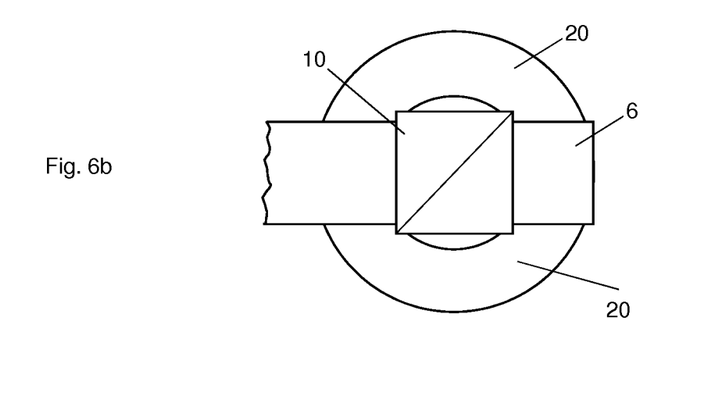
FIG. 6b shows a top down view of the detailed view of the third embodiment.

In FIG. 6a and FIG. 6b the arrangement of the third embodiment is shown in detail. In the FIG. 6b the arrangement is shown from a top-down view. As can be seen, the antenna element 10 is a cylindrical or spiral coil wound around the ferrite block 6.

The invention claimed is:
1. An inductive power transfer unit, comprising:
 a winding unit for inductive power transfer during a power transfer operation,
 flux guiding means, and
 an antenna element, wherein:
the antenna element is arranged with the flux guiding means for generating or receiving an antenna signal during an auxiliary operation, and
wherein a compensation element is arranged, such that the compensation element compensates for an induced voltage and/or induced current in the antenna element during the power transfer operation.

2. The inductive power transfer unit according to claim 1, wherein the antenna element is wound around the flux guiding means for generating or receiving an antenna signal during the auxiliary operation.

3. The inductive power transfer unit according to claim 1, wherein the antenna element is wound around the flux guiding element in a first winding direction,
wherein the compensation element is wound around the flux guiding means in a second winding direction around the flux guiding means,
wherein the first winding direction and the second winding direction are opposite directions around the flux guiding means, such that the compensation element compensates for an induced voltage and/or induced current in the antenna element during the power transfer operation.

4. The inductive power transfer unit according to claim 1, wherein the antenna element is wound around the flux guiding element in a first winding direction,
wherein the compensation element is wound around the flux guiding means in a second winding direction around the flux guiding means,
wherein the first winding direction and the second winding direction are the same direction around the flux guiding means, and
wherein the antenna element and the compensation element are electrically connected in such a way, that the compensation antenna element compensates for an induced voltage and/or induced current in the antenna element during the power transfer operation.

5. The inductive power transfer unit according to claim 1, wherein the antenna element is wound around the flux guiding means at a first location of the flux guiding means and the compensation element is wound around the flux guiding means at a second location of the flux guiding means distanced to the first location, and wherein during the power transfer operation a value of a magnetic flux through the flux guiding means at the first location is lower than a value of the magnetic flux through the flux guiding means at the second location.

6. The inductive power transfer unit according to claim 1, wherein the number of turns of the antenna element is larger than the number of turns of the compensation element.

7. The inductive power transfer unit according to claim 1, wherein the antenna element and the compensation element are arranged such that the amplitude value of the antenna signal received or transmitted by the antenna element is larger than the amplitude value of the antenna signal received by the compensation element.

8. The inductive power transfer unit according to claim 1, wherein the compensation element has a magnetic axis and with regard to its magnetic axis is arranged perpendicular to the direction of the magnetic flux density vector of the antenna signal.

9. The inductive power transfer unit according to claim 1, wherein the antenna element and the compensation element each have a magnetic axis and with regard to their magnetic axes are arranged perpendicular to each other.

10. The inductive power transfer unit according to claim 1, wherein the sensor antenna element is a transmitting antenna element.

11. The inductive power transfer unit according to claim 1, wherein the antenna element is a receiving antenna element.

12. The inductive power transfer unit according to claim 1, wherein the flux guiding means has a permeability $\mu_r$ between 1 and 500000.

* * * * *

UNITED STATES PATENT AND TRADEMARK OFFICE
CERTIFICATE OF CORRECTION

PATENT NO. : 11,121,581 B2  
APPLICATION NO. : 15/768321  
DATED : September 14, 2021  
INVENTOR(S) : Robert Czainski et al.

Page 1 of 1

It is certified that error appears in the above-identified patent and that said Letters Patent is hereby corrected as shown below:

In the Claims

Column 10, Line 30, Claim 10, before "antenna" delete "sensor"

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*